Patented Apr. 30, 1946

2,399,504

UNITED STATES PATENT OFFICE 2,399,504

DEHYDRATING METHOD AND APPARATUS

Walter A. Patrick, Jr., Baltimore, Md.

Application June 27, 1942, Serial No. 448,874

12 Claims. (Cl. 159—22)

This invention relates to method and apparatus for dehydrating, or concentrating, any material required to be so treated, for example, biological products, such as serums, vaccines, etc., and foods, such as eggs, milk, fruit juices, etc. The principal object of the invention is to provide a system whereby the materials may be efficiently and relatively rapidly and inexpensively reduced to the desired stage.

Heretofore processes have been used requiring the freezing of material and its sublimation. Such sublimation requires the use of high vacuum, is objectionably slow, and characterizes a procedure which is prohibitively expensive for ordinary commercial operations.

According to the present invention, the material may or may not be initially frozen prior to dehydration. In either event, I utilize naturally generated heat to maintain an above freezing temperature in the evaporating zone.

In the use of desiccants in the nature of sorptive agents such as silica gel, activated alumina, etc., the temperature of the desiccant is raised as a result of the condensation thereby of the water vapor derived from the drying substance. The term "sorb" is used herein as covering the phenomena of adsorption or absorption, that is to say, the idea of mechanical condensation in general. Where the desiccant is in the nature of a chemical with which the water vapor will react to form a hydrate, there is a resultant heat of reaction. The term "desiccant" as used herein denotes any substance which will take up evolved vapor, either by sorption or chemically, with a consequent generation of heat. Regardless of how the heat is generated, it adversely affects the efficiency of the desiccant. According to the present invention this heat, or a portion of it, is transferred to the evaporating zone with the result that the desiccant is automatically maintained at an efficient temperature while the evaporating zone is automatically maintained at an above freezing temperature.

As above stated, the material may or may not be initially frozen. However, under some circumstances it is desirable first to freeze the material by any suitable means and then, by the application of suction, to draw off the entrained gases, such as carbon dioxide, while the material is still in a more or less frozen state. This procedure is particularly effective for the quick removal of the gases.

While many forms of apparatus are suitable for carrying out the new process, I have shown in the accompanying drawing a simple form which will suffice to make clear the principles involved. In this drawing, to which reference will now be made:

Figure 1:
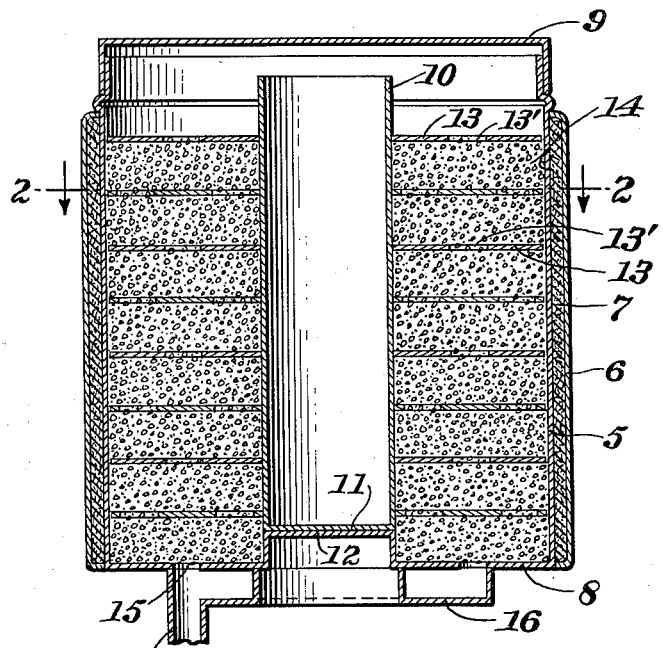
Figure 1 is a longitudinal or vertical section of the apparatus.
Figure 2:
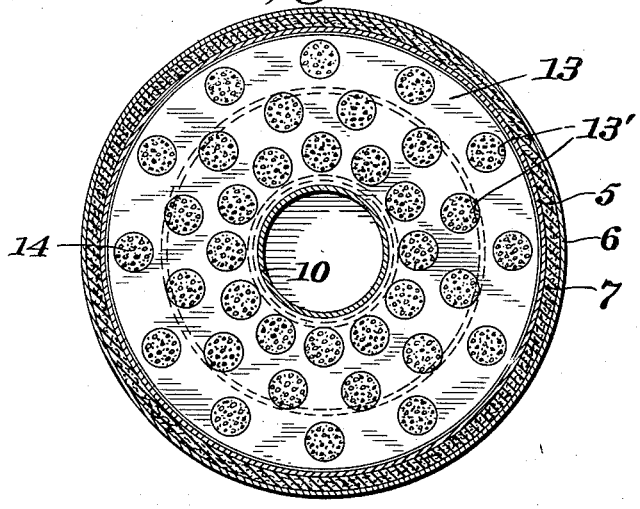
Figure 2 is a section on line 2—2 of Figure 1.

Referring to the drawing, reference numerals 5 and 6 designate upright inner and outer concentric cylindrical shells of any suitable material, these shells defining an annular space between them which, as here shown, is filled with insulation 7. A bottom wall 8 is secured to the two shells and a removable cover 9 is adapted to be applied to an upward extension or neck of the inner shell, forming an airtight seal with the latter. The margins of wall 8 may rest on a suitable supporting stand, not shown.

Concentrically disposed within the shells is a cylinder 10 which terminates below the cover and is open at the top but is closed at the bottom by a wall 11, this cylinder being supported on a table 12 struck up from the bottom wall 8. Cylinder 10 is made of material having good heat conductivity, for example, copper, and at intervals has secured thereto, as by soldering, annular fins 13 which may also be of copper, these fins having numerous perforations 13', with those of adjacent fins preferably out of register with each other. The fins 13, while in a good thermal contact with the cylinder 10, preferably terminate somewhat short of shell 5, and packed between the fins is a mass 14 of suitable desiccant, preferably silica gel. It will be seen that cylinder 10 and shell 5 define between them a portion of a suction or vacuum line in which the desiccant is disposed.

Formed in the bottom wall 8 is a circular series of openings 15 in communication with an annular manifold 16 which through a tube 17 is connectible to any suitable source of reduced pressure. The vacuum producing means may be a conventional pump, but since means of only comparatively low capacity is required, a steam jet evacuator of small capacity is desirably used.

In the practice of the invention, the material to be dehydrated is placed in the cylinder 10, cover 9 is applied, and the vacuum means started and all or most of the air is removed. The entrained gases will then first of all be drawn off, and due to their adsorption the temperature of the gel will rise, the heat being transferred not only by the gel itself, but also by the fins 13, to the cylinder 10, thereby raising the temperature in the latter. In the case of pre-freezing, before there has been any substantial thawing of the material, the gases will have been withdrawn. The evolved vapor, whether or not there has been pre-freezing, is likewise drawn into the desiccant and ordinarily the capacity of the latter will be such that all of the vapor will be taken up. In any event, the capacity of the desiccant is so related to the capacity of the cylinder 10 that an above freezing temperature will be maintained in the latter and the desiccant will be maintained at an efficient, substantially constant, operating temperature. The capacity of the desiccant for the purpose of maintaining the material being dehydrated at an above-freezing temperature is determined by several factors; for example, when silica gel is used the factors include the area of gel surface exposed to the heat conducting surfaces, including the fins 13, the thickness of the gel layers, and the temperature gradient between the gel and the material being dehydrated.

As a specific example of the practice of the invention in dehydrating blood serum as an adhesive for uniting the cushion discs of crown caps with metal shells, the following is given:

For this use a serum having 46.64% solids is desired. Blood serum usually has about about 8.8% solids and the higher solid content is desired to prevent the formation of steam when heat is applied to set the serum. For example, 750 units of blood serum, liquid or frozen, may be introduced into the chamber 10 and the dehydrating or concentrating operation continued until the volume is reduced to 140 units. This residue, which is viscous as compared to the original serum, may then be removed and dialysed to decrease the salt content from an average of 5.3% to the average initial salt content of approximately 1%. This product is very satisfactory in the manufacture of crown caps.

The operation may be carried to a point where the product is in substantially solid state. However, the removal of such a product from the container makes the carrying of the process to such a stage in the disclosed apparatus somewhat inconvenient, removal being most readily accomplished by tilting the apparatus to pour therefrom a product which will still flow. Where a substantially solid product is required the operation may be carried on in two steps, if desired. The material may be concentrated in the disclosed apparatus to a point where it is still liquid, and then removed, and the operation completed in the use of apparatus such as is disclosed in the copending application of John D. Elder and myself, Serial No. 448,875, filed simultaneously herewith.

It is to be understood that the invention is susceptible of variation in practice, and that such variations are contemplated under the following claims.

I claim:

1. Dehydrating apparatus comprising a container for the material to be dehydrated, said container having a peripheral heat conductive wall, a body of desiccant surrounding said wall, heat conductive elements embedded in said body and contacting said wall, and a suction line in connection with the container and including said body of desiccant.

2. Dehydrating apparatus comprising a container for the material to be dehydrated, said container having a peripheral wall of metal, a body of desiccant surrounding said wall and retained thereagainst, and a suction line in connection with said container and including said body of desiccant.

3. Dehydrating apparatus comprising a container for the material to be dehydrated, said container having a peripheral wall of metal, a body of desiccant surrounding said wall and retained thereagainst, metal fins surrounding said wall in contact therewith and embedded in said body, and a suction line in connection with said container and including said body of desiccant.

4. Dehydrating apparatus comprising a container for the material to be dehydrated, said container having a heat conductive wall, a container in communication with said first mentioned container and having therein a body of desiccant, heat conducting elements embedded in said body of desiccant and contacting the heat conductive wall of said material container, and a suction line in communication with both the material container and the desiccant container.

5. Dehydrating apparatus comprising a container for the material to be dehydrated, said container having a heat conductive wall, a container in communication with said first mentioned container and having therein a body of desiccant, heat conducting elements embedded in said body of desiccant and contacting the heat conductive wall of said material container, said desiccant having such capacity that the heat therefrom will maintain the material to be dehydrated above freezing, and a suction line in communication with both the material container and the desiccant container.

6. Dehydrating apparatus comprising a container for the material to be dehydrated, said container having a peripheral heat conducting wall, a body of desiccant around said wall, heat conducting elements around said wall in contact therewith and embedded in said body of desiccant, and a suction line in communication with said container and said body of desiccant.

7. Dehydrating apparatus comprising a container for the material to be dehydrated, said container having a heat conductive wall, a body of desiccant maintained against said wall, and a suction line in connection with said container and including said body of desiccant.

8. The method of dehydrating which comprises introducing into a container having a heat-conductive wall the material to be dehydrated, applying suction to the container to promote evaporation and to withdraw the vapors from said container, and passing the vapors into a desiccant whose sorptive efficiency decreases upon increase in temperature and which is in contact with the exterior of said wall so that the desiccant is cooled as the result of the expansion effect in said container and the material is heated as a result of the condensing action of the desiccant and is maintained at an above freezing temperature.

9. The method of dehydrating which comprises introducing into a container a batch of frozen liquid material to be dehydrated, applying suction to the container to withdraw entrained gases from the material and continuing the application of suction to promote evaporation and to withdraw the vapors, and passing the vapors into a desiccant whose sorptive efficiency decreases upon increase in temperature and which is separate from but in heat exchanging relation to the material so that the desiccant is cooled as the result of the expansion effect in the container and the material is heated as a result of the condensing action of the desiccant and is melted and maintained at an above freezing temperature.

10. The method of dehydrating liquid material having a gaseous content, which comprises freezing the material, applying suction to the material to remove the gaseous content while the material is subject to thawing, continuing the application of suction to the material to promote the evaporation thereof, and passing the evolved vapors into a body of desiccant which is separate from but in heat exchanging relation to the material and has a heat supplying capacity adequate to maintain the material in an atmosphere above freezing temperature throughout dehydration.

11. Dehydrating apparatus comprising means for containing a liquid to be dehydrated, said containing means having a heat conductive wall, a body of desiccant maintained against the outside of said wall, and a suction line for drawing vapors from the liquid into contact with the desiccant.

12. The method of dehydrating which comprises introducing into a containing means having a heat-conductive wall a liquid to be dehydrated, applying suction to the liquid to withdraw vapors therefrom, and passing the vapors into contact with a body of desiccant which is in contact with the outside of said wall.

WALTER A. PATRICK, Jr.